United States Patent
Sandberg et al.

(10) Patent No.: US 12,361,176 B2
(45) Date of Patent: Jul. 15, 2025

(54) INTEGRITY TREE FOR MEMORY SECURITY

(71) Applicant: Arm Limited, Cambridge (GB)

(72) Inventors: Andreas Lars Sandberg, Cambridge (GB); Roberto Avanzi, Grasbrunn (DE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/003,841

(22) PCT Filed: Jun. 25, 2021

(86) PCT No.: PCT/GB2021/051620
§ 371 (c)(1),
(2) Date: Dec. 29, 2022

(87) PCT Pub. No.: WO2022/003327
PCT Pub. Date: Jan. 6, 2022

(65) Prior Publication Data
US 2023/0259660 A1    Aug. 17, 2023

(30) Foreign Application Priority Data
Jul. 3, 2020   (GB) .................................... 2010204

(51) Int. Cl.
*G06F 21/78* (2013.01)
*G06F 21/64* (2013.01)
*G06F 21/70* (2013.01)
*G06F 21/72* (2013.01)

(52) U.S. Cl.
CPC .............. *G06F 21/78* (2013.01); *G06F 21/64* (2013.01); *G06F 21/72* (2013.01)

(58) Field of Classification Search
CPC .......... G06F 21/78; G06F 21/64; G06F 21/72; G06F 21/70
See application file for complete search history.

(56) References Cited

U.S. PATENT DOCUMENTS

| | | | |
|---|---|---|---|
| 2004/0003244 A1* | 1/2004 | England | G06F 21/10 713/168 |
| 2019/0042795 A1* | 2/2019 | Bolotov | G06F 11/1048 |
| 2019/0260799 A1* | 8/2019 | Chen | G06F 12/1408 |

FOREIGN PATENT DOCUMENTS

| WO | 2019/025762 A1 | 2/2019 |
|---|---|---|
| WO | 2020/128413 A1 | 6/2020 |

* cited by examiner

*Primary Examiner* — Vu V Tran
(74) *Attorney, Agent, or Firm* — NIXON & VANDERHYE P.C.

(57) ABSTRACT

A data integrity tree for memory security comprises a plurality of nodes, wherein a linked series of nodes of the data integrity tree protects a data item stored in memory. A parent node in the linked series of nodes comprises a plurality of counters, each associated with a respective child node and providing an input to a protection function associated with the respective child node. A node authentication code protects the plurality of counters in each parent node and is dependent on a counter in a node above the parent node in the data integrity tree. A plurality of hash value child nodes each comprises a plurality of encrypted hash values generated as a function of a respective block of data stored in the memory and as a function of a counter comprised in a node above the hash value child node in the data integrity tree.

17 Claims, 9 Drawing Sheets

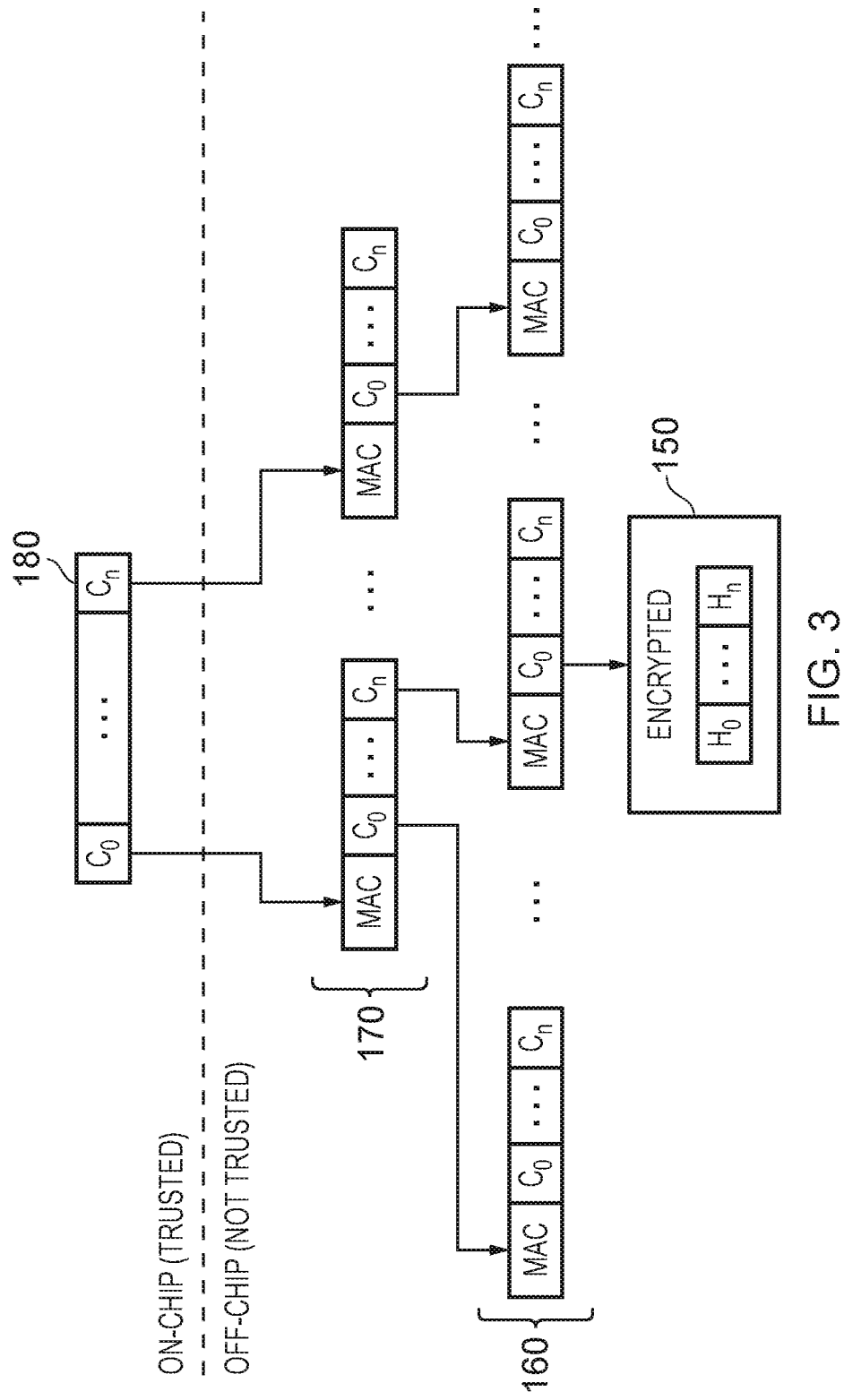

INTEGRITY TREE FOR MEMORY SECURITY

The present techniques relate to data processing. More particularly they relate to memory security.

Some data processing contexts may need to handle data which comprises secret or sensitive information and should not be exposed to a potentially malicious outside agent. However it may not be practical to store all such information in a data storage device which cannot be tampered with by external agents. For example, where trusted data processing handling protected data may take place in an on-chip data processing apparatus, there may not be the capacity on-chip to provide trusted storage for all of the sensitive data which must be protected. Accordingly it may be necessary to export some sensitive information to a memory which could be vulnerable to attack. To provide security for data stored in a potentially unsafe memory, it is possible to encrypt the data values before they are stored to the memory and also to store integrity check values associated with the data values, which can later be used to verify, when the data is read from the unsafe memory, that the data has not been modified since it was stored to the memory. However there may be a significant storage overhead associated with the storage of such integrity check values. Some contemporary implementations may use more than 25% of the protected memory for the storage of metadata (including the integrity check values) in order to protect the integrity of the remainder of the data values in that protected memory.

At least some examples provide an apparatus comprising:
data integrity circuitry to verify integrity of data stored in a memory,
wherein the data integrity circuitry is arranged to maintain a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node,
wherein the plurality of nodes comprises at least one parent node, each parent node comprising:
a plurality of counters, wherein each counter of the plurality of counters is associated with a respective child node to which the parent node is parental and provides an input to a protection function associated with the respective child node; and
a node authentication code protecting the plurality of counters, wherein the node authentication code is generated in dependence on the plurality of counters and on a further counter comprised in a further parent node which is parental to the parent node,
and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

At least some examples provide a method of verifying integrity of data stored in a memory comprising:
maintaining a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node,
wherein the plurality of nodes comprises at least one parent node, each parent node comprising:
a plurality of counters, wherein each counter of the plurality of counters is associated with a respective child node to which the parent node is parental and provides an input to a protection function associated with the respective child node; and
a node authentication code protecting the plurality of counters, wherein the node authentication code is generated in dependence on the plurality of counters and on a further counter comprised in a further parent node which is parental to the parent node,
and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

At least some examples provide an a non-transitory computer-readable storage medium storing a computer program to control a data processing apparatus to carry out the method set out above.

At least some examples provide a computer program for controlling a host data processing apparatus to provide an instruction execution environment, comprising:
data integrity program logic to verify integrity of data stored in a memory,
wherein the data integrity program logic is arranged to maintain a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node,
wherein the plurality of nodes comprises at least one parent node, each parent node comprising:
a plurality of counters, wherein each counter of the plurality of counters is associated with a respective child node to which the parent node is parental and provides an input to a protection function associated with the respective child node; and
a node authentication code protecting the plurality of counters, wherein the node authentication code is generated in dependence on the plurality of counters and on a further counter comprised in a further parent node which is parental to the parent node,
and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

At least some examples provide an apparatus comprising:
means for maintaining a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node, wherein the plurality of nodes comprises at least one parent node, each parent node comprising:
a plurality of counters, wherein each counter of the plurality of counters is associated with a respective child node to which the parent node is parental and provides an input to a protection function associated with the respective child node; and
a node authentication code protecting the plurality of counters, wherein the node authentication code is generated in dependence on the plurality of counters and on a further counter comprised in a further parent node which is parental to the parent node, and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

The present techniques will be described further, by way of example only, with reference to embodiments thereof as illustrated in the accompanying drawings, to be read in conjunction with the following description, in which:

FIG. 1 schematically illustrates an example of an apparatus having data integrity circuitry for verifying integrity of data stored in a memory;

FIG. 2A shows an example of a data integrity tree used to verify the integrity of data stored in a memory according to the present techniques;

FIG. 2B schematically illustrates an example of circuitry used to verify the integrity of data stored in a memory with reference to a data integrity tree according to the present techniques;

FIG. 2C schematically illustrates an example of circuitry used to verify the integrity of a set of counter blocks forming a path through the data integrity tree according to the present techniques;

FIG. 3 shows an example of a data integrity tree used by a trusted on-chip agent to verify the integrity of data stored in an off-chip memory according to the present techniques, where the data integrity tree itself is partially stored on-chip and partially stored off-chip;

Figure 1:
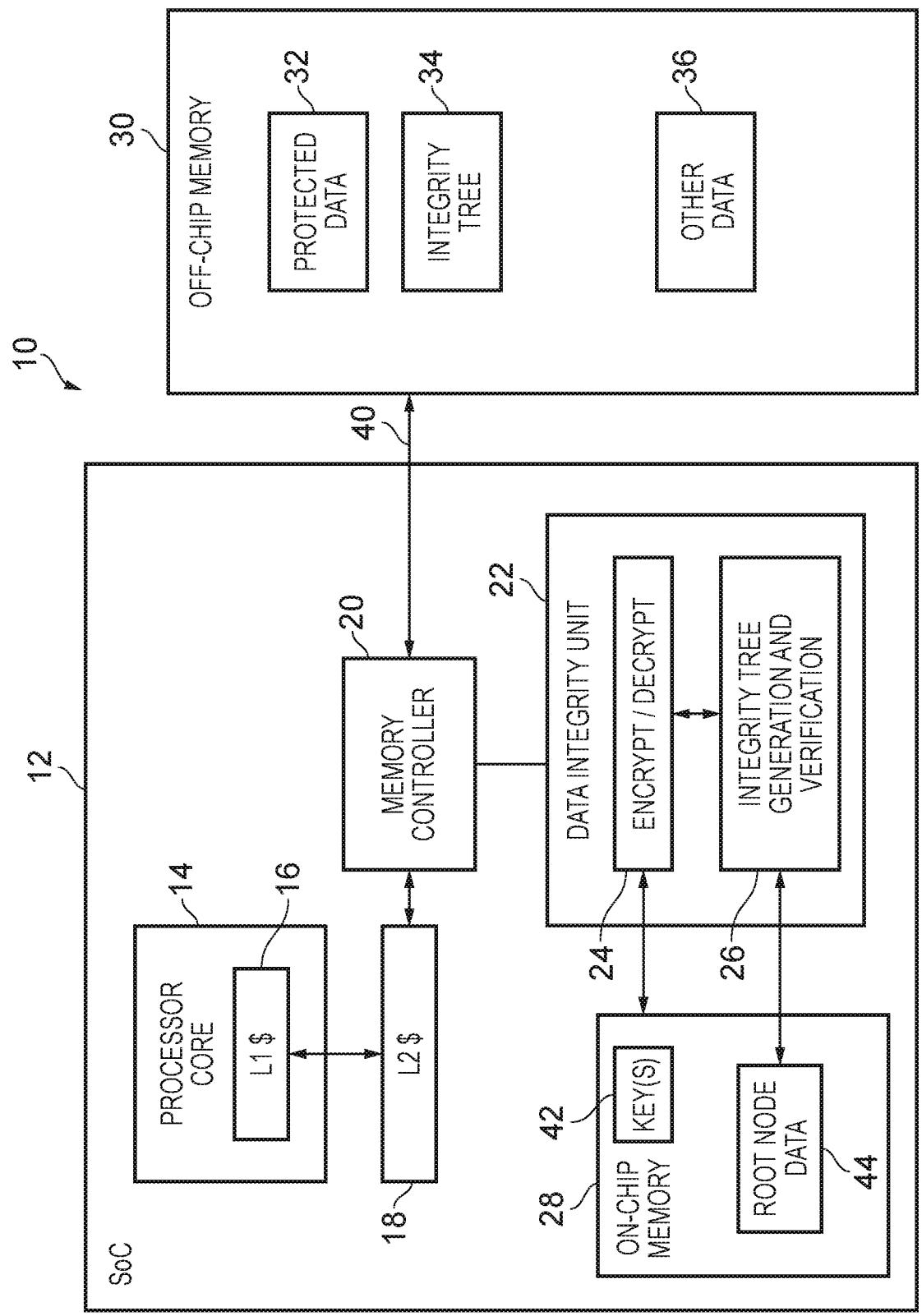

In one example herein there is an apparatus comprising:
data integrity circuitry to verify integrity of data stored in a memory,
wherein the data integrity circuitry is arranged to maintain a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node, wherein the plurality of nodes comprises at least one parent node, each parent node comprising:
a plurality of counters, wherein each counter of the plurality of counters is associated with a respective child node to which the parent node is parental and provides an input to a protection function associated with the respective child node; and
a node authentication code protecting the plurality of counters, wherein the node authentication code is generated in dependence on the plurality of counters and on a further counter comprised in a further parent node which is parental to the parent node, and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

Data integrity trees of different forms may be provided to protect the integrity of data stored in the memory. For example a traditional Merkle Tree (MT) is formed as a tree of hashes. The root of the tree is stored in a secure storage location and levels below the root can be stored in insecure storage locations. Each node in the tree contains the hash of a block of nodes below it. The leaf nodes of the tree contains hashes of the data items that the tree is protecting. To verify the integrity of data, the data hashes are recalculated and compared to the corresponding leaf node. The integrity of the tree then needs to be verified by calculating a hash for a block of nodes and comparing it to the hash stored in the parent level. The storage overhead for such a traditional Merkle Tree is however significant. A variant of the traditional Merkle Tree is the Bonsai Merkle Tree (BMT) which improves performance by storing blocks of nonces (counters) that are protected by authentication codes (e.g. MACs). These MACs can be formed by taking a cryptographic hash of some data and encrypting it with a secret key that is derived from a system-wide secret, an address (to prevent an attack from moving data), and a nonce to prevent replay. The leaf nodes of the tree provide nonces for a separate data structure containing MACs of the protected data. The counters of the BMT can be updated in parallel and so the BMT improves performance over a traditional Merkle Tree by allowing parallel updates of all levels of the tree when updating data protected by the tree. Nevertheless the storage overhead for the implementation of a BMT is non-trivial, for example assuming a block size of 64 bytes, 56-bit counters and 64-bit MACs, the storage overhead of the BMT itself is close to 15% and the data MACs require another 12.5% of storage.

The present techniques propose an approach in which a data integrity tree is formed as a tree of counters in which blocks of counters in nodes of the data integrity tree are protected by respective authentication codes. The node authentication codes protect the plurality of counters in their respective block and are each dependent on a counter in a node above them in the data integrity tree. However the data integrity tree is not entirely made up of counters and a plurality of hash value nodes are provided at a given level of the data integrity tree, where these hash value nodes each comprise a plurality of encrypted hash values, which are generated as a function of a respective block of data stored in the memory and also as a function of a counter comprised in a node above the hash value child node in the data integrity tree. This hybrid structure removes the need for the separate data MACs of the BMT and reduces the storage overhead from around 27% to around 15% in the example given above with respect to the BMT. Since the hashes are encrypted they have the same security properties as the data MACs of the BMT and also like the BMT individual hashes can be updated independently (by decrypting the relevant hash block and updating the corresponding hash value). However unlike the BMT the an encrypted set of hashes shares the same counter, leading to the improved storage efficiency.

The block of data on the basis of which the encrypted hash values are generated may in principle be any arbitrary data stored in the memory which is in need of protection. In some embodiments the block of data is a set of data items protected by the linked series of nodes of the data integrity tree, where the set of data items do not form part of the data integrity tree. However the block of data may itself (at least partially) comprise counters from the data integrity tree and accordingly in some embodiments the block of data is a set of data items comprising at least one counter node forming part of the data integrity tree. The at least one counter node may form a root of a new integrity sub-tree.

The plurality of hash value child nodes may in principle be implemented at any level of the data integrity tree, but in some embodiments they are leaf nodes of the data integrity tree.

Alternatively the plurality of hash value child nodes may be implemented at a level of the data integrity tree other than the leaf node level. Accordingly in some embodiments each leaf node of the plurality of leaf nodes of the data integrity tree comprises a plurality of hash values generated as a function of a respective block of data stored in the memory, and the plurality of encrypted hash values of the plurality of hash value child nodes are generated as a function of the plurality of hash values of the plurality of leaf nodes of the data integrity tree. Hence a lower (closer to the leaf nodes) set of levels of the data integrity tree may be formed by hash values, whilst an upper (closer to the root node) set of levels of the data integrity tree may be formed by counters (nonces).

In some embodiments the plurality of hash value child nodes are implemented at the level immediately above the leaf node level and hence such embodiments the plurality of hash value child nodes are parental to the leaf nodes of the data integrity tree.

There may however be further levels of the data integrity tree between the level at which the plurality of hash value child nodes are implemented and the leaf node level and accordingly in some embodiments at least one plurality of intermediate hash value nodes interposes between the plurality of hash value child nodes and the leaf nodes of the data integrity tree, wherein the plurality of hash value child nodes are parental to the at least one plurality of intermediate hash value nodes and wherein the at least one plurality of intermediate hash value nodes are parental to the leaf nodes of the data integrity tree.

The root node of the data integrity tree may be implemented in a number of ways, in particular with respect to the manner in which it is protected (since the security of the entire data integrity tree depends on the security of the root node values). In some embodiments the plurality of nodes comprises a root node comprising: a plurality of root counters, wherein each root counter of the plurality of root counters is associated with a respective parent node to which the root node is parental and provides an input to a protection function associated with the respective parent node.

In some embodiments the apparatus further comprises: local storage, wherein the data integrity circuitry is arranged to maintain a first portion of the data integrity tree comprising the plurality of nodes other than the root node in the memory; and wherein the data integrity circuitry is arranged to maintain a second portion of the data integrity tree comprising the root node in the local storage. Such an arrangement means that the local storage must be trusted, but the memory can be implemented in a manner where its security cannot be guaranteed. Subdividing the storage of the data integrity tree like this therefore means that the security of the data integrity tree is assured by control over the local storage (which may only comprise a fraction of the storage capacity of the memory) and the remainder of the data integrity tree can be stored in the un-trusted memory without compromising system security.

The manner in which the local storage is protected maybe implemented in a variety of ways, but in some embodiments the apparatus is embodied as an on-chip device and the memory is embodied as off-chip memory. Here it will therefore be understood that on-chip storage can be arranged to be trusted, whilst the off-chip memory cannot be guaranteed to assure such security.

The manner in which the encryption of the hash values is performed may vary but in some embodiments the data integrity circuitry is arranged to generate the plurality of encrypted hash values as a function of a secret key value stored in the local storage.

The data integrity tree proposed by the present techniques can therefore be used to verify the integrity of the data items stored in a memory. The particular sequence of actions which the apparatus takes with respect to performing such verification actions may vary but in some embodiments the data integrity circuitry is responsive to modification of a target data item stored in the memory to:
  decrypt a corresponding plurality of encrypted hash values generated as a function of a corresponding block of data to which the target data item belongs;
  update a target hash value corresponding to the target data item; and
  encrypt the corresponding plurality of encrypted hash values including the updated target hash value.

Furthermore as mentioned above the data integrity tree of the present techniques allows the simultaneous update of counters at more than one level of the tree when updating data protected by the tree. The manner in which such parallel updates are implemented may vary but in some embodiments the data integrity circuitry is responsive to an access to accessed data item stored in the memory, for a set of counters comprised in the linked series of nodes of the data integrity tree which protects the accessed data item, to update at least two counters of the a set of counters in parallel.

In one example herein there is a method of verifying integrity of data stored in the memory comprising:
  maintaining a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node, wherein the plurality of nodes comprises at least one parent node, each parent node comprising:
  a plurality of counters, wherein each counter of the plurality of counters is associated with a respective child node to which the parent node is parental and provides an input to a protection function associated with the respective child node; and
  a node authentication code protecting the plurality of counters, wherein the node authentication code is generated in dependence on the plurality of counters and on a further counter comprised in a further parent node which is parental to the parent node, and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

In one example herein there is a non-transitory computer-readable storage medium storing a computer program to control a data processing apparatus to carry out the method set out above.

In one example herein there is a computer program for controlling a host data processing apparatus to provide an instruction execution environment, comprising:
  data integrity program logic to verify integrity of data stored in a memory,
  wherein the data integrity program logic is arranged to maintain a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node,
  wherein the plurality of nodes comprises at least one parent node, each parent node comprising:
    a plurality of counters, wherein each counter of the plurality of counters is associated with a respective child node to which the parent node is parental and provides an input to a protection function associated with the respective child node; and
    a node authentication code protecting the plurality of counters, wherein the node authentication code is generated in dependence on the plurality of counters and on a further counter comprised in a further parent node which is parental to the parent node,
  and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

In one example herein there is an apparatus comprising:
means for maintaining a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node, wherein the plurality of nodes comprises at least one parent node, each parent node comprising:
  a plurality of counters, wherein each counter of the plurality of counters is associated with a respective child node to which the parent node is parental and provides an input to a protection function associated with the respective child node; and
  a node authentication code protecting the plurality of counters, wherein the node authentication code is generated in dependence on the plurality of counters and on a further counter comprised in a further parent node which is parental to the parent node, and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

Some particular embodiments are now described with reference to the figures.

FIG. 1 schematically illustrates an example of a data processing system, which comprises an integrated circuit or system-on-chip 12 which includes at least one processor core 14 for executing program instructions to carry out data processing operations. While FIG. 1 only shows one processor core, in some cases the system-on-chip 12 may comprise multiple processors. Each processor core or processor core cluster may have a cache 16 (or multiple levels of cache 16, 18). The memory controller 20 acts as memory access circuitry for controlling access to an off-chip memory 30, which is on a separate integrated circuit from the system-on-chip 12. While accesses to data on-chip may be difficult for an attacker to tamper with, data passing beyond the edge boundary of the chip may be vulnerable to attack. This could for example involve interception of data on the physical channel 40, via which the memory controller 20 communicates with the off-chip memory 30, or it might be by reading or modifying the data while it is stored in the off-chip memory 30. While the above example is described in terms where the trust boundary corresponds the edge of the system-on-chip, in other cases there could be a trust boundary within the system-on chip itself, where data beyond the trust boundary might be exposed to potential attacks. The system-on-chip 12 further comprises a data integrity unit 22, which is provided for protecting certain protected data 32 stored in the off-chip memory 30. Since the off-chip memory 30 is beyond the trust boundary, this protection is necessary, since a malicious agent who has physical access to the system could observe and/or replay the data values being exchanged between the processor core 14 and the off-chip memory 30. Also stored in the off-chip memory is data 34 relating to an integrity tree, used to protect and verify the integrity of the protected data 32. Note that in fact, in some embodiments, part of the integrity tree itself may form at least part of the protected data, so the separate illustration of the protected data 32 and the integrity tree 34 in FIG. 1 should not be seen as absolute. Further data 36 may also be stored in the off-chip memory 30, which is not protected by the data integrity unit 22 and thus could be accessed and modified by an attacker. In some implementations the mapping of addresses to protected data regions and unprotected data regions may be fixed by the hardware, so that it is not possible for an operating system or other software executed by the processor core 14 to vary which addresses are mapped to the protected memory region and the unprotected memory region. Alternatively, if the operating system controlling the address mapping can be trusted, the address mapping controlling which addresses are mapped to the protected region and the unprotected region may be varied by the processor under the control of the software, such that the protected and unprotected regions need not always be mapped to the same physical locations in the off-chip memory 30.

The data integrity unit 22 includes encryption/decryption circuitry 24 for encrypting data being written to the off-chip memory 30 and for decrypting encrypted data read from the off-chip memory 30. One or more encryption keys 42 used by the encryption/decryption processes may be stored within an on-chip memory (e.g. SRAM) 28, although these could for example be stored within the data integrity unit 22 itself. Any known technique may be used for the encryption/decryption and any known approach to protecting the encryption keys can be used. This encryption provides privacy by preventing a malicious observer from seeing in the clear the data being read from or stored to the off-chip memory 30. The encryption/decryption unit 24 is also used to generate message authentication codes (MACs) to associate with nodes of the integrity tree and to encrypt/decrypt hash values generated by the integrity tree generation and verification circuitry 26. These message authentication codes may be generated using one-way cryptographic functions, such as the VMAC class of algorithms (encrypted universal hashes), which may be preferable in this context over more complex, but nevertheless still feasible, functions such as AES-GCM or SHA-256. Such techniques make use of functions which make it computationally infeasible for an attacker to guess the authentication code associated with a particular data value by brute force when the secret key used to generate the authentication code is unknown. The authentication codes form part of the integrity tree 34 stored in the off-chip memory 30. The stored MAC for a data value is checked against a calculated MAC derived from the stored data using the same one-way function used to generate the stored MAC and if a mismatch is detected between the stored MAC and the calculated MAC this may indicate that the data has been tampered with.

However, providing MACs alone may not be sufficient to prevent all attacks. Another type of attack may be a replay attack, in which a malicious agent with physical access to the system captures a combination of encrypted data and a MAC observed on the transmission line 40 and then later replays these on the transmission line with, for example, the intent of corrupting data at a given memory location with stale value so as to compromise the operation of the system. Such replay attacks can be prevented using a data integrity tree of the type proposed herein, which is generally provided having a tree structure of nodes, wherein leaf nodes of the tree provide integrity data for verifying that a block of protected data 32 in the off-chip memory 30 is valid, and wherein a parent node of a leaf node provides further integrity data for checking that the leaf node itself is valid. Such parent nodes themselves may be checked using further parent nodes leading up the tree and this chain continues as the tree is traversed up to its root, which may then provide the ultimate source of verification. At least some root node data 44 is stored in the on-chip memory 28 and can be used to verify that the root of the tree is authentic. The entire root may be stored in the on-chip memory 28 or by storing partial root information which enables the root node stored as protected data 32 in the off-chip memory 30 to be authenticated. The integrity tree is administered by the integrity tree generation and verification circuitry 26. The integrity tree comprises values 34 stored in the off-chip memory 30 and root node data 44 stored in the on-chip memory 28. The structure of the integrity tree, its maintenance, and its use to verify integrity of the protected data is described in more detail below. It should be noted that MACs mentioned above (and in any of the other embodiments described herein) can be formed by taking a cryptographic hash of some data (here, the set of counters protected by the MAC) and encrypting it using: a secret key, an address (to prevent an attack from moving data), and a nonce (counter from the parent node) to prevent replay.

Figure 2A:
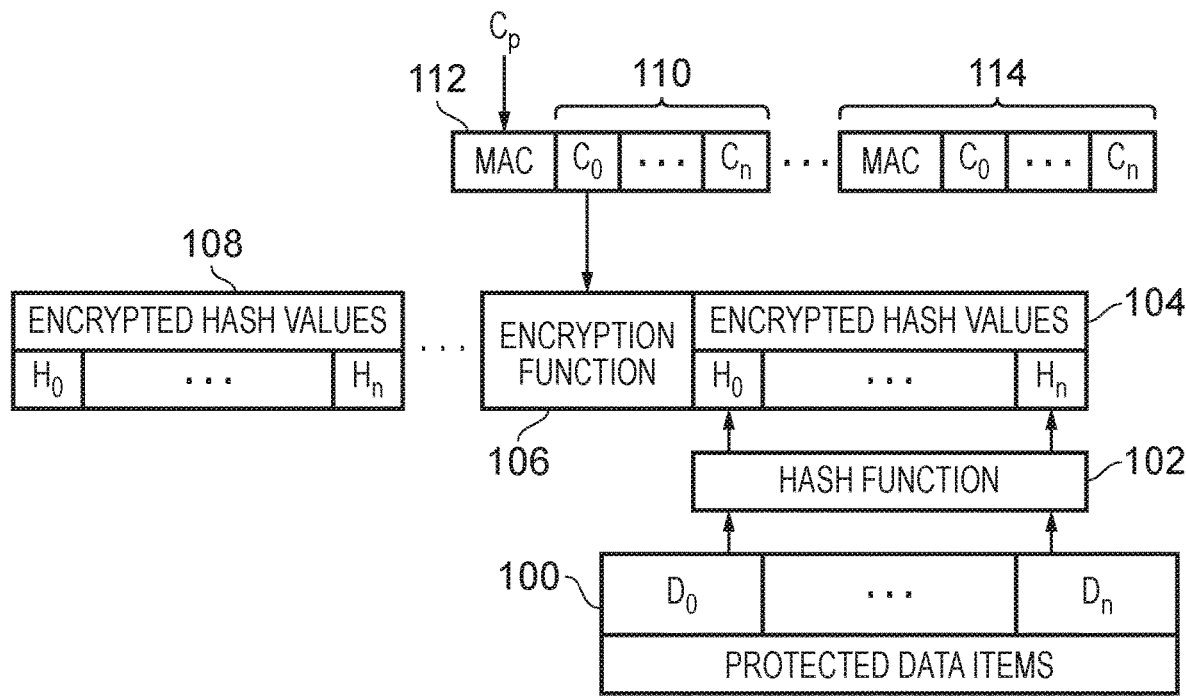

There are a number of ways in which the data integrity tree can be implemented. FIG. 2A shows an example of a portion of an integrity tree and one of the blocks of data protected by it. A block of data 100 comprises a set of data items $D_0 \ldots D_n$ which are stored as part of the protected data 32 in the off-chip memory 30.

This set of data items is hashed using the hash function 102, which is implemented by the integration tree generation verification circuitry 26 in the data integrity unit 22. A corresponding set of hash values $H_0 \ldots H_n$ is thus generated and these are encrypted by means of an encryption function 106, implemented by the encrypted/decrypt circuitry 24 of the data integrity unit 22. An encrypted set of hash values 104 thus results and, in this example embodiment, forms one of the leaf nodes of the data integrity tree. Further leaf nodes of the data integrity tree comprise further sets of encrypted hash values 108 generated in dependence on further sets of protected data items. There may be an arbitrary number of leaf nodes of the data integrity tree, as long as the system has the storage capacity to store them and the further nodes of the data integrity tree and has the processing capability to administer the size of data integrity tree which then results. Note that the encryption function 106 takes a counter value (nonce) as an input when encrypting the set of hash values to generate the encrypted hash values node 104, where this counter value form part of node in the next level up the data integrity tree. Thus as shown in the example of FIG. 2A a counter value $C_0$ provides this input to the encryption function 106 when it generates the set of encrypted hash values 104. This counter value $C_0$ forms part of a set of counter values $C_0 \ldots C_n$ 110, which together form a node at the next level up the data integrity tree. This set of counter values 110 is protected by a MAC 112, which is generated in dependence on a further counter value $C_p$, provided at a further level up the data integrity tree. Thus the node of which the further counter value $C_p$ forms part is parental to the node formed by the set of counter values 110, which in turn is parental to the node formed by the set of encrypted hash values 104. This linked sequence of nodes and thus leads from a leaf node of the data integrity tree all the way up to the root node of the data integrity tree and may comprise an arbitrary number of levels of the data integrity tree, again as long as the system has the storage capacity to store these levels and has the processing capability to administer the size of data integrity tree which then results.

In some examples the hash levels are formed using the following operation (where $\|$ is the concatenation operator):
$$E_{k'}(H(D_0\|D_1\| \ldots \|D_n))$$
where $E()$ is the encryption function and $H()$ is the hash function. The key, k', may be derived from a (global) secret key (k), a counter (C), and the address (a) of the hash block.

That is:

$k' = f(k, C, a)$

In some implementation the encryption algorithm used may support a "tweak" in addition to a secret key, where broadly speaking the "tweak" can be thought of as a second key. An advantage that the tweak brings is that it is generally cheaper to change than the key in a hardware implementation of such ciphers, so may be preferred for variable parameters like addresses and nonces. In such a case, the operation takes the form:

$E_{k,}(C \| a, H(D_0 \| D_1 \| \ldots \| D_n))$

Including the address in the key derivation function/tweak ensures that it is not possible to move a hash block between two positions in the tree. The counter ensures that the decrypted hashes are only valid when used together with the right counter (i.e., it prevents replay by cryptographically binding the hashes to the parent counter). Note that including the counter in the hash wouldn't be beneficial since that would mean that all of the hashes in a block would have to be recomputed when the counter is updated. It should be noted that an advantage of the present techniques disclosed herein is that it is possible to decrypt the hash block, update a single hash, increment the counter, and re-encrypt it without recomputing the rest of the hashes in the block.

Figure 2B:
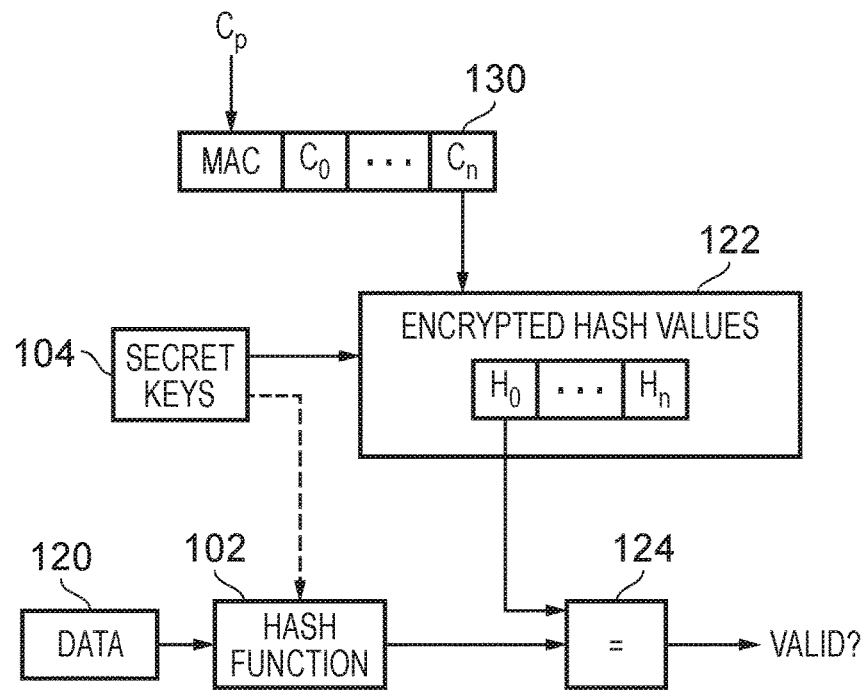

The use of the data integrity tree partially illustrated in FIG. 2A to verify integrity of the data item is schematically illustrated in FIG. 2B. When a data item 120 is retrieved from the off-chip memory 30, the hash function 102 is used to generate a hash value on the basis of that data item. Note that the hash function 102 may optionally take a secret key value 104 (dashed line in the figure) which may for example be stored as one of the keys 42 in the on-chip memory 28. However note that this is generally not necessary. Strong hash functions typically would not need this. However, some hash functions (universal hash functions in particular) need to be picked at random (effectively by providing a key) from a population of hash functions to make them unpredictable and secure. If the parameters of the universal hash function can be predicted, an adversary could conceivably use this information to engineer hash conflicts and forge data. When the data item 120 is retrieved a corresponding encrypted block of hash values 122 is also retrieved and using a secret key 104 is decrypted. The hash value corresponding to the retrieved data item 120, which in this illustrated example is the hash value $H_0$, is thus decrypted and can then be compared to the hash value generated from the retrieved data item 120 by the comparison 124. If these values match then the integrity of the retrieved data item 120 is verified. If they do not match this suggests that either the data item 120 or the set of encrypted hash values 12 or both have been interfered with. When a data item is accessed the counter value (nonce) used for the encryption of the corresponding block of hash values can be incremented (and the encrypted block of hash values accordingly updated), to protect against a replay attack which has observed this retrieval of data item 120 and its associated encrypted block hash values 122 from the off-chip memory 30.

Figure 2C:
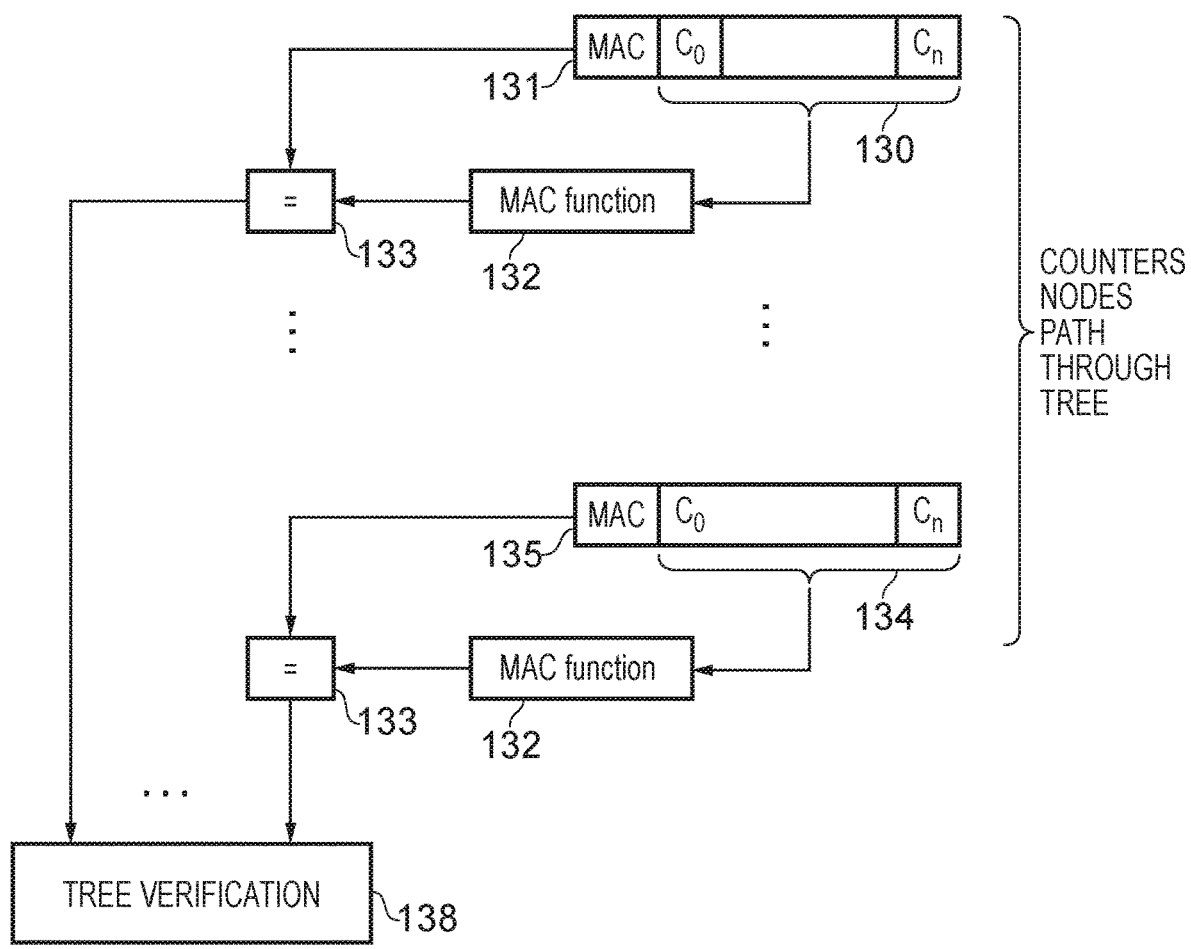

FIG. 2C schematically illustrates an example of circuitry used to verify the integrity of a set of counter blocks forming a path through the data integrity tree. When a data item is retrieved from memory, a set of counter blocks are also retrieved with it. These counter blocks include the set of counters which are used to protect (by their use as nonces) the data item and thus these counters are thus a set of nodes representing a path through the data integrity tree, leading from the root node to the encrypted hash values derived from the data item (within its block of data items). The integrity tree generation and verification circuitry 26 shown in FIG. 1 may therefore have components such as those shown in FIG. 2C to verify the integrity of sets of counter blocks. A set of counter blocks 130 is used by MAC function circuitry 132 for a fresh calculation of a MAC value which is then compared to the MAC value 131 retrieved with the set of counter blocks 130 by comparison circuitry 133. An arbitrary number of further counter blocks may be similarly checked in this manner, with the illustration of FIG. 2C only showing one (for clarity purposes) with the set of counter blocks 134 is used by the MAC function circuitry 132 for a fresh calculation of a MAC value which is then compared to the MAC value 135 retrieved with the set of counter blocks 134 by the comparison circuitry 133. It will be understood that the MAC calculations and comparisons may be performed in parallel (by parallel components) or in series by repeated use of the same component. The final verification of the tree (circuitry 138) requires that all retrieved MAC values matched the recalculated MAC values.

The general structure of a data integrity tree according to the present techniques is schematically illustrated in FIG. 3. This illustration shows a "complete" linked set of nodes, in the sense that a full path leading from an encrypted set of hash values 150 to a root node 180 is shown. Of course the data integrity tree is nevertheless largely incomplete in the illustration of FIG. 3, purely due to the constraints of clear illustration here and thus only one encrypted set of hash values 150 at the leaf node level of the data integrity tree is shown (but many more form the full data integrity tree). Similarly only a selection of the nodes formed by sets of counter values are shown at the further levels 160 and 170 leading to the root node 180. Just to give a single example a data integrity tree structure may be formed at which a 1:8 ratio of parent nodes to child nodes is implemented, such that 8 counters are provided in the root node 180, each protecting a block of counters at the node level 170 (such that there are then 8 blocks of counters at that node level). Each block of counters at the node level 170 then protects a block of counters at the node level 160 (such that there are then 64 blocks of counters at that node level). Each block of counters at the node level 160 then protects a block of encrypted hash values at the leaf node level of the data integrity tree (such that there are then 512 blocks of encrypted hash values). Each block of encrypted hash values may comprise eight hash values corresponding to eight data items, and hence 4096 individual data items may be protected by this data integrity tree. The person of ordinary skill in this art will recognise that these examples of the number of counters in each block of counters, the number of levels of nodes, and the number of encrypted hash values in a block of encrypted hash values are arbitrary and may be freely varied without departing from the scope of the present techniques. Nevertheless there may of course be computational advantages to selecting numbers which are powers of two, in a manner with which one of ordinary skill in this art is familiar. It is to be noted further with respect to the data integrity tree shown in FIG. 3 that a trust boundary is shown between those portions of the data integrity tree which are stored in a trusted location on-chip and those which are stored in a non-trusted location off-chip. Where the hierarchical nature of the data integrity tree means that all parts of the data integrity tree are ultimately connected to one of the counter values in the root node 180, the trusted storage and maintenance of this root node there means that the entire data integrity tree can be trusted.

Figure 4A:
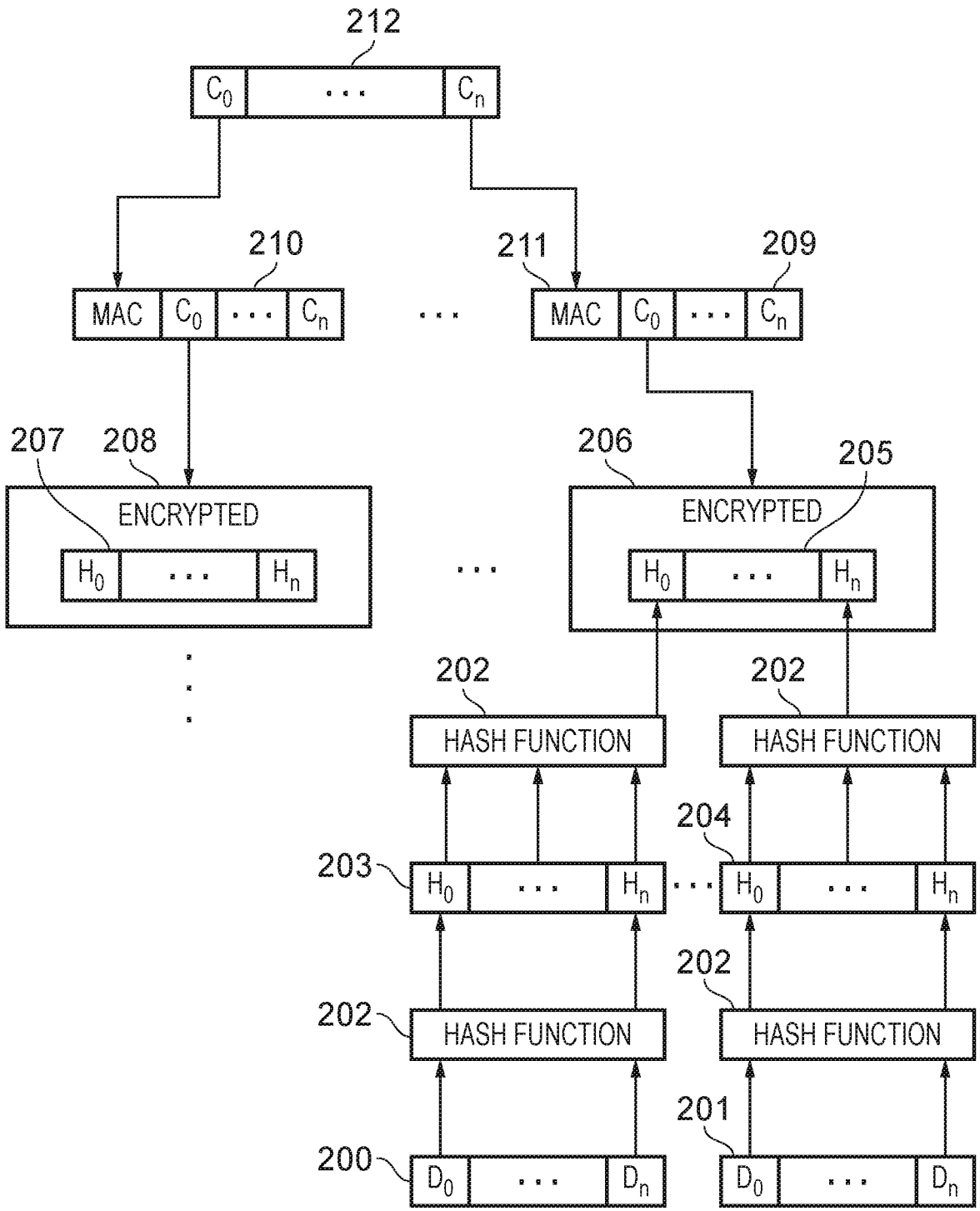
FIG. 4A shows an example of a data integrity tree used to verify the integrity of data stored in a memory according to the present techniques.

FIG. 4A schematically illustrates a variant on the structure of a data integrity tree in some example embodiments. As in the example of FIG. 2A a set of data items 200 is hashed by means of the hash function 202 to generate a corresponding set of hash values 203. Parallel to this a further set of data items 201 is shown hashed by means of the same hash function 202 to generate a corresponding set of hash values 204. These sets of hash values 203 and 204 form leaf nodes of the data integrity tree (along with many others which are not illustrated in FIG. 4A). Each of these sets of hash values forms the input to the hash function 202 to thus form a respective hash value in the set of hash values 205 at the next level up the data integrity tree. This node of the data integrity tree 206 is thus parental to the leaf nodes 203 and 204.

Furthermore this set of hash values 205 is encrypted, using a secret key and a counter value from the next level up the data integrity tree, namely the counter $C_0$ in the set of counter values 209. The set of counter values 209 is protected by the MAC 211. The MAC 211 and the set of counter values 209 thus form a node which is parental to the node comprising the set of encrypted hash values 206. The MAC 211 is generated on the basis of the set of counter values 209, a secret key value, and a counter from the next level up the data integrity tree, which in the example of FIG. 4A is the counter value $C_n$ of the set of counter values 212. The levels of the data integrity tree may thus continue with further parental levels of counters providing the input for the respective MAC calculations. However in the example of FIG. 4A the set of counter values 212 is illustrated without an associated MAC value, so here this is the root node, stored in a trusted location. FIG. 4A also shows another example set of hash values 207 encrypted to form another node 208 at the same level as the node 206, as well as another example set of count values 210 forming a node at the same level as the set of counter values 209. Accordingly it will be understood that this example data integrity tree positions the set of encrypted hash values at a node level above the leaf node level and therefore that the sets of encrypted hash values do not need to form the leaf node level of the data integrity tree. Indeed the choice of where the transition of the data integrity tree from hash values to a set of encrypted hash values, where the encryption comprises a counter value provided by the next level higher in the data integrity tree, may be varied, depending on the particular implementation requirements.

Figure 4B:
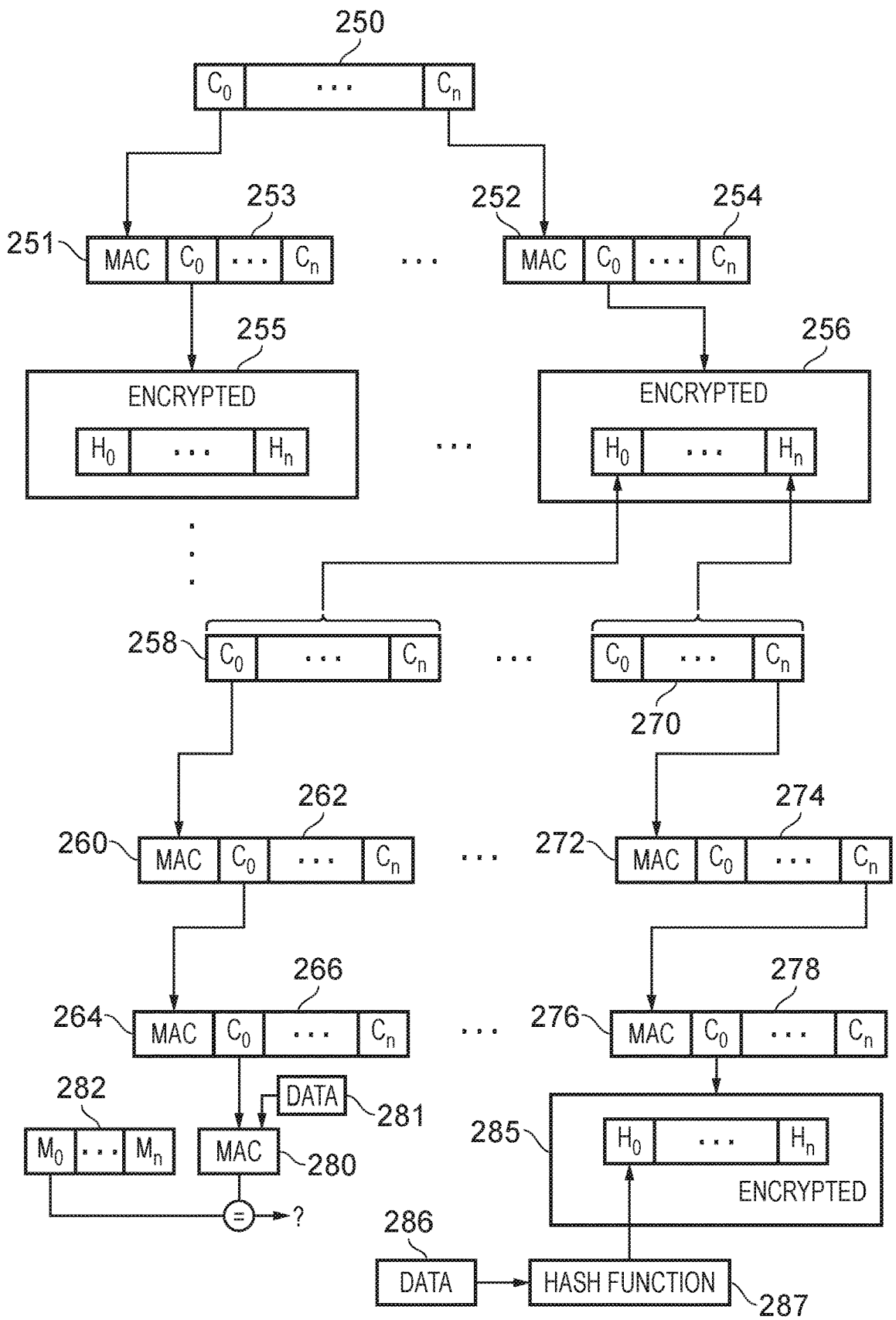
FIG. 4B shows an example of a data integrity tree used to verify the integrity of data stored in a memory according to the present techniques.

FIG. 4B schematically illustrates a variant on the structure of a data integrity tree in some example embodiments. Here the encrypted sets of hash values 255 and 256, as in the case of the example of FIG. 4A, are "mid-level" nodes of the integrity tree. However by contrast to FIG. 4A the data protected by the encrypted sets of hash values 255 and 256 are counter trees which fan out below them in the illustrated structure. These "sub-trees" of counters are shown in this example to have a structure of three levels, though this is an arbitrary choice. The counter nodes 258 and 270 are thus each a root node for an integrity sub-tree formed of the levels beneath them in the figure. The encrypted set of hash values 256 is thus based on hashes of counter blocks 258, 270. Each of these counter blocks then provides a counter value for the calculated MAC value (260, 272 in the two examples shown in the illustration) protecting a child block of counter values (262, 274 in the two examples shown in the illustration). Counter values in each of these counter blocks provides a counter value for the calculated MAC value (264, 276 in the two examples shown in the illustration) protecting a child block of counter values (266, 278 in the two examples shown in the illustration). The leaf level of counter values (266, 278) may be used in alternative ways, an example of each of which are shown in FIG. 4B. A counter from the set of counter values 266 is shown being used in the traditional BMT manner, of providing an input to a MAC calculation 280 to protect a data item 281 (by comparison to a stored MAC value from a set 282). A counter from the set of counter values 278 is shown being used to protect a further encrypted set of hash values 285, generated on the basis of data including data item 286 (by use of the hash function 287). These alternative uses of the counter values are both shown in FIG. 4B for the purposes of comparison and in many implementations only one approach to data protection or the other will be implemented. Hence FIG. 4B is another example of an integrity tree where the set of encrypted hash values are at a node level which is above the leaf node level. Furthermore, FIGS. 4A and 4B show that the block of data in memory protected by the encrypted hash values may be separate (arbitrary) data distinct from the integrity tree (FIG. 4A) or may comprise data which represents at least part of the integrity tree itself (FIG. 4B).

Figure 5:
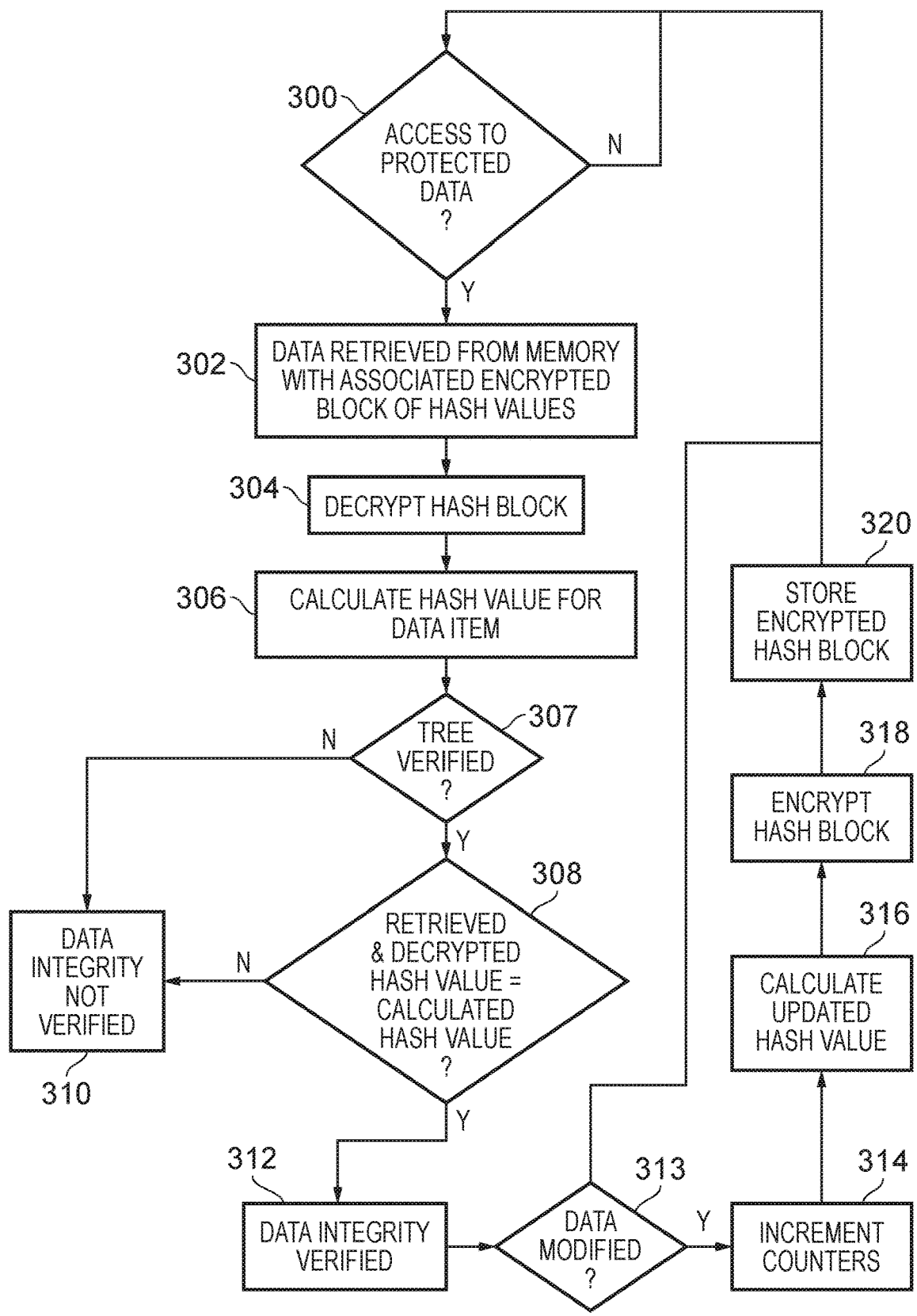
FIG. 5 is a flow diagram illustrating a sequence of steps which are taken to verify the integrity of data retrieved from memory according to an example of a method of the present techniques.

FIG. 5 is a flow diagram showing a sequence of steps which are taken according to the method of some embodiments. The flow can be considered to begin at step 300, where it is determined if access to a protected data item has been made. Until this happens the flow loops on itself at this step. When such access takes place, the method proceeds to step 302, where the data item is retrieved from the memory along with its associated encrypted block of hash values. The encrypted block of hash values is decrypted at step 304. Then at step 306 the hash value for the retrieved data item is calculated. At step 307 it is verified if the counter blocks retrieved generate the correct MAC value (as retrieved with them) (see FIG. 2C). At step 308 it is determined if the retrieved and decrypted hash value corresponding to this data item and the hash value calculated from the retrieved data item match. If they do not, the flow ends at step 310, since the integrity of the retrieved data item and encrypted block of hash values has not been verified. Various defensive, remedial, or cautionary actions may be taken as a result. However if the values at step 308 do match then the flow proceeds to step 312 and the integrity of the retrieved data item and the encrypted block of hash values has been verified. Then from step 313, if the data has not been modified, the flow returns to step 300. Alternatively, if the data has been modified, then the flow proceeds to step 314. The respective counters in the data integrity tree can then be incremented (with the MAC protecting each set of counters correspondingly being updated), and at step 316 an updated hash value for the data item (if modified) can then be calculated. The block of hash values is then re-encrypted at step 318 and stored at step 320. The flow then returns to step 300.

Figure 6:
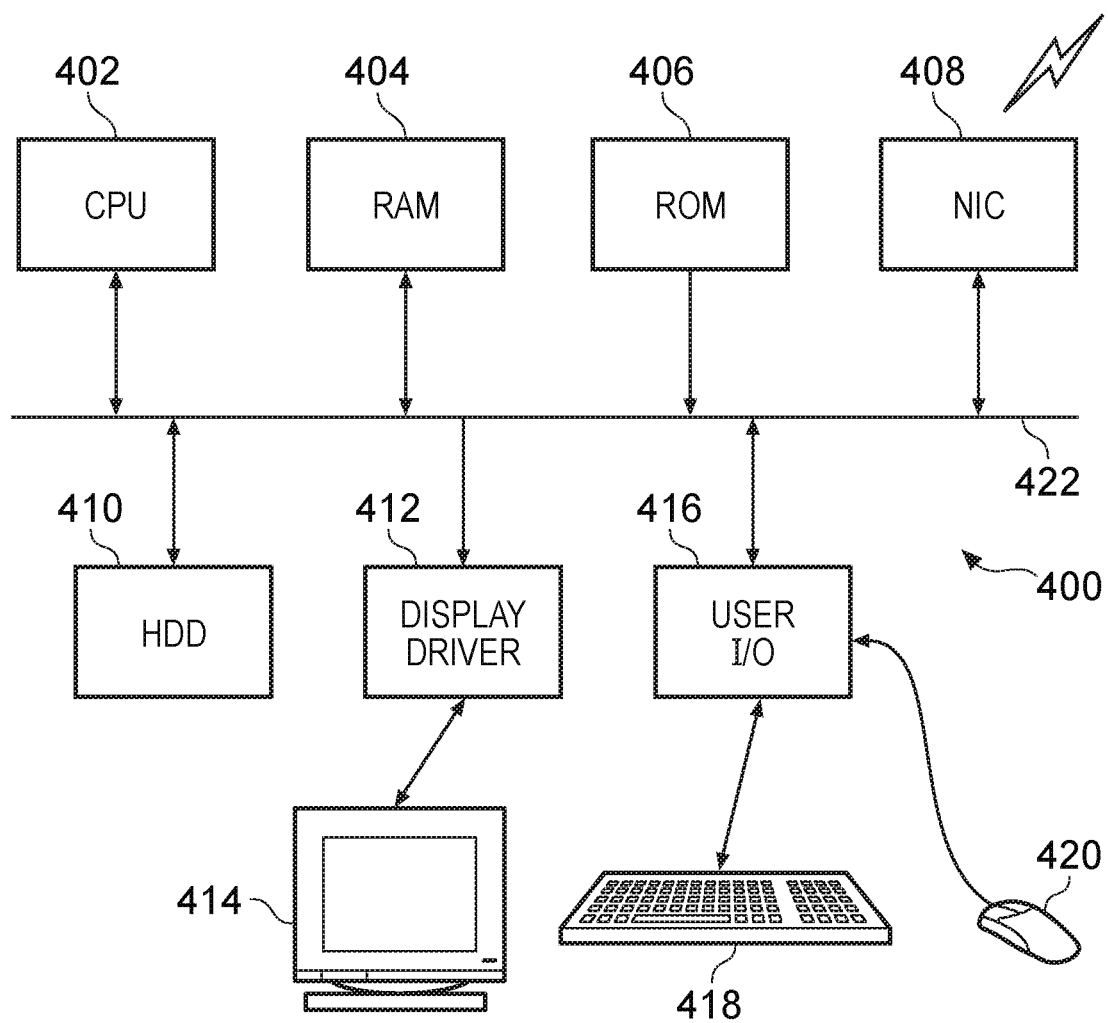
FIG. 6 show a general purpose computer which may be used to support execution of software implementations.

Although the present techniques have been described above in FIG. 1 and with occasional reference to FIG. 1 in terms of an integrated circuit device with some components (such as the data integrity unit 22) constructed explicitly for the purpose of implementing these techniques, in other embodiments the present techniques may be embodied in software. FIG. 6 schematically illustrates a general purpose computer 400 of the type that may be used to implement the above described techniques. The general purpose computer 400 includes a central processing unit 402, a random access memory 404, a read only memory 406, a network interface card 408, a hard disk drive 410, a display driver 412 and monitor 414 and a user input/output circuit 416 with a keyboard 418 and mouse 420 all connected via a common bus 422.

In operation the central processing unit 402 will execute computer program instructions that may be stored in one or more of the random access memory 404, the read only memory 406 and the hard disk drive 410 or dynamically downloaded via the network interface card 408. The results of the processing performed may be displayed to a user via the display driver 412 and the monitor 414. User inputs for controlling the operation of the general purpose computer 400 may be received via the user input output circuit 416 from the keyboard 418 or the mouse 420. It will be appreciated that the computer program could be written in a variety of different computer languages. The computer program may be stored and distributed on a recording medium or dynamically downloaded to the general purpose computer 400. When operating under control of an appropriate computer program, the general purpose computer 400 can perform the above described techniques and can be considered to form an apparatus for performing the above described technique. For example, the RAM 404 may represent the untrusted memory in which protected data must be stored and local storage within the CPU 402 may be trusted for the storage of certain root node data. Alternatively the RAM 404 may be trusted and another storage location (such as the HDD 410 or even a remote storage location accessed via the NIC 408) may be the untrusted location. The architecture of the general purpose computer 400 could vary considerably and FIG. 6 is only one example.

Alternatively, the above-described techniques may be implemented in a more distributed fashion, wherein the general purpose computer 400 illustrated in FIG. 6 may be expanded and/or replaced by an infrastructure comprising components implemented on separate physical devices, the separate physical devices sharing the processing required to carry out these techniques. Such separate physical devices may be physically proximate to one another, or may even be located at entirely different physical locations. In some configurations such an infrastructure is termed a "cloud computing" arrangement.

Figure 7:
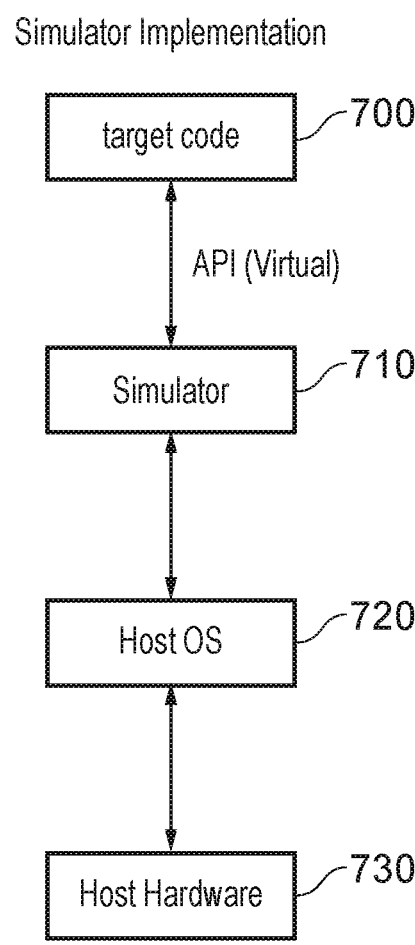
FIG. 7 shows a simulator example which may be used.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the interface of the hardware architecture being modelled by the simulator program 710. Thus, the program instructions of the target code 700, including instructions for reading or writing data in the off-chip memory 30, may be executed from within the instruction execution environment using the simulator program 710, so that a host computer 730 which does not actually have the hardware features of the apparatus 12 discussed above can emulate these features.

In brief overall summary, a data integrity tree for memory security comprises a plurality of nodes, wherein a linked series of nodes of the data integrity tree protects a data item stored in memory. A parent node in the linked series of nodes comprises a plurality of counters, each associated with a respective child node and providing an input to a protection function associated with the respective child node. A node authentication code protects the plurality of counters in each parent node and is dependent on a counter in a node above the parent node in the data integrity tree. A plurality of hash value child nodes each comprises a plurality of encrypted hash values generated as a function of a respective block of data stored in the memory and as a function of a counter comprised in a node above the hash value child node in the data integrity tree.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   data integrity circuitry to verify integrity of data stored in a memory,
   wherein the data integrity circuitry is arranged to maintain a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node,
   wherein the plurality of nodes comprises at least one parent node, each parent node comprising:
   a plurality of counters, wherein each counter of the plurality of counters is associated with a respective child node to which the parent node is parental and provides an input to a protection function associated with the respective child node; and
   a node authentication code protecting the plurality of counters, wherein the node authentication code is generated in dependence on the plurality of counters and on a further counter comprised in a further parent node which is parental to the parent node,
   and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

2. The apparatus as claimed in claim 1, wherein the block of data is a set of data items protected by the linked series of nodes of the data integrity tree, where the set of data items do not form part of the data integrity tree.

3. The apparatus as claimed in claim 1, wherein the block of data is a set of data items comprising at least one counter node forming part of the data integrity tree.

4. The apparatus as claimed in claim 3, where the at least one counter node forms a root of a new integrity sub-tree.

5. The apparatus as claimed in claim 1, wherein the plurality of hash value child nodes are leaf nodes of the data integrity tree.

6. The apparatus as claimed in claim 1, wherein each leaf node of the plurality of leaf nodes of the data integrity tree comprises a plurality of hash values generated as a function of a respective block of data stored in the memory,
   and wherein the plurality of encrypted hash values of the plurality of hash value child nodes are generated as a function of the plurality of hash values of the plurality of leaf nodes of the data integrity tree.

7. The apparatus as claimed in claim 6, wherein the plurality of hash value child nodes are parental to the leaf nodes of the data integrity tree.

8. The apparatus as claimed in claim 6, wherein at least one plurality of intermediate hash value nodes interposes between the plurality of hash value child nodes and the leaf nodes of the data integrity tree, wherein the plurality of hash value child nodes are parental to the at least one plurality of intermediate hash value nodes and wherein the at least one plurality of intermediate hash value nodes are parental to the leaf nodes of the data integrity tree.

9. The apparatus of claim 1, wherein the plurality of nodes comprises a root node comprising:
   a plurality of root counters, wherein each root counter of the plurality of root counters is associated with a respective parent node to which the root node is parental and provides an input to a protection function associated with the respective parent node.

10. The apparatus as claimed in claim 9, further comprising:
    local storage,
    wherein the data integrity circuitry is arranged to maintain a first portion of the data integrity tree comprising the plurality of nodes other than the root node in the memory; and
    wherein the data integrity circuitry is arranged to maintain a second portion of the data integrity tree comprising the root node in the local storage.

11. The apparatus as claimed in claim 10, wherein the apparatus is embodied as an on-chip device and the memory is embodied as off-chip memory.

12. The apparatus as claimed in claim 10, wherein the data integrity circuitry is arranged to generate the plurality of encrypted hash values as a function of a secret key value stored in the local storage.

13. The apparatus of claim 1, wherein the data integrity circuitry is responsive to modification of a target data item stored in the memory to:
    decrypt a corresponding plurality of encrypted hash values generated as a function of a corresponding block of data to which the target data item belongs;
    update a target hash value corresponding to the target data item; and
    encrypt the corresponding plurality of encrypted hash values including the updated target hash value.

14. The apparatus of claim 1, wherein the data integrity circuitry is responsive to an access to accessed data item stored in the memory, for a set of counters comprised in the linked series of nodes of the data integrity tree which protects the accessed data item, to update at least two counters of a set of counters in parallel.

15. A method of verifying integrity of data stored in a memory comprising:
    maintaining a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node,
    wherein the plurality of nodes comprises at least one parent node, each parent node comprising:
    a plurality of counters, wherein each counter of the plurality of counters is associated with a respective child node to which the parent node is parental and provides an input to a protection function associated with the respective child node; and
    a node authentication code protecting the plurality of counters, wherein the node authentication code is generated in dependence on the plurality of counters and on a further counter comprised in a further parent node which is parental to the parent node,
    and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

16. A non-transitory computer-readable storage medium storing a computer program to control a data processing apparatus to carry out the method of claim 14.

17. A non-transitory computer-readable storage medium storing a computer program for controlling a host data processing apparatus to provide an instruction execution environment, comprising:
- data integrity program logic to verify integrity of data stored in a memory,
- wherein the data integrity program logic is arranged to maintain a data integrity tree comprising a plurality of nodes, wherein a linked series of nodes of the data integrity tree protects a data item stored in the memory, and wherein, for first and second nodes consecutive in the linked series of nodes, where the first node is nearer to a root node of the data integrity tree and the second node is nearer to a leaf node of the data integrity tree, the first node is parental to the second node,
- wherein the plurality of nodes comprises at least one parent node, each parent node comprising:
- a plurality of counters, wherein each counter of the plurality of counters is associated with a respective child node to which the parent node is parental and provides an input to a protection function associated with the respective child node; and
- a node authentication code protecting the plurality of counters, wherein the node authentication code is generated in dependence on the plurality of counters and on a further counter comprised in a further parent node which is parental to the parent node,
- and wherein the plurality of nodes comprises a plurality of hash value child nodes, wherein each hash value child node of the plurality of hash value child nodes comprises a plurality of encrypted hash values generated as a function of a respective block of data stored in the memory and as a function of a counter comprised in a further parent node which is parental to the hash value child node.

\* \* \* \* \*